(12) United States Patent
Raabe et al.

(10) Patent No.: US 9,994,431 B2
(45) Date of Patent: Jun. 12, 2018

(54) POSITIONING AREA FOR A ROUTE FOR VERTICALLY INSERTING CURRENT COLLECTOR CONTACTS IN THE CURRENT RAILS OF THE ROUTE

(71) Applicant: Paul Vahle GmbH & Co. KG, Kamen (DE)

(72) Inventors: Michael Raabe, Werne (DE); Thomas Muller, Kamen (DE); Steffen Woyczechowski, Dortmund (DE)

(73) Assignee: Paul Vahle GmbH & Co. KG, Kamen (DE)

( * ) Notice: Subject to any disclaimer, the term of this patent is extended or adjusted under 35 U.S.C. 154(b) by 0 days. days.

(21) Appl. No.: 14/895,415

(22) PCT Filed: Feb. 5, 2015

(86) PCT No.: PCT/EP2015/052422
§ 371 (c)(1),
(2) Date: Dec. 2, 2015

(87) PCT Pub. No.: WO2015/154896
PCT Pub. Date: Oct. 15, 2015

(65) Prior Publication Data
US 2017/0022033 A1     Jan. 26, 2017

(30) Foreign Application Priority Data
Apr. 11, 2014   (DE) .................. 10 2014 105 228

(51) Int. Cl.
*B66C 13/12*     (2006.01)
*B60L 5/38*     (2006.01)
(Continued)

(52) U.S. Cl.
CPC ............. *B66C 13/12* (2013.01); *B60L 5/04* (2013.01); *B60L 5/16* (2013.01); *B60L 5/36* (2013.01);
(Continued)

(58) Field of Classification Search
CPC . B66C 13/12; B66C 13/14; B60L 5/00; B60L 5/005; B60L 5/04; B60L 5/36; B60L 5/38; B60L 5/40; B60L 5/42
See application file for complete search history.

(56) References Cited

U.S. PATENT DOCUMENTS 5,476,358 A     12/1995   Costa
2016/0123521 A1   5/2016   Morano

FOREIGN PATENT DOCUMENTS

AT     505757 B1   4/2009
CH     681909 A5   6/1993
(Continued)

OTHER PUBLICATIONS

International Search Report (with English translation) and Written Opinion dated May 15, 2015 in International Application No. PCT/EP2015/055569.
(Continued)

*Primary Examiner* — Robert J McCarry, Jr.
(74) *Attorney, Agent, or Firm* — Panitch Schwarze Belisario & Nadel LLP

(57) ABSTRACT

The invention relates to a positioning zone (EB) for a travel path (1), wherein the travel path (1) has at least one guide rail (2, 3) and the guide rail (2, 3) is used to guide a current collector trolley (11), provided with current collector contacts (12), of a current collector system (10) arranged on a vehicle which can move along the travel path (1), and the travel path (1) has at least one travel path conductor bar (5), wherein the current collector trolley (11) can be moved
(Continued)

Figure 1:
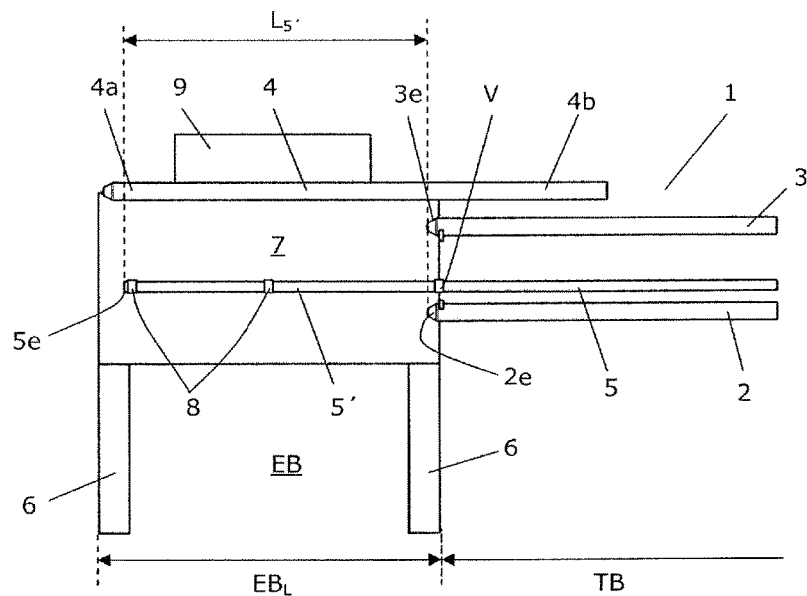

horizontally and vertically to the travel path (1) in the positioning zone (EB) by a positioning device of the current collector system (10), characterized in that at least one further conductor bar (5') is arranged in the region of the positioning zone (EB) or at least one travel path conductor bar (5) extends and/or is extended into the positioning zone (EB) beyond at least one guide rail (2, 3) of the travel path (1).

20 Claims, 10 Drawing Sheets

(51) Int. Cl.
    *B60M 1/30*     (2006.01)
    *B66C 19/00*     (2006.01)
    *B60L 5/04*     (2006.01)
    *B60L 5/36*     (2006.01)
    *B60L 5/16*     (2006.01)
    *B60L 5/40*     (2006.01)

(52) U.S. Cl.
    CPC ................... *B60L 5/38* (2013.01); *B60L 5/40* (2013.01); *B60M 1/30* (2013.01); *B66C 19/007* (2013.01)

(56) References Cited

FOREIGN PATENT DOCUMENTS

| | | |
|---|---|---|
| CN | 101993005 A | 3/2011 |
| CN | 201864480 U | 6/2011 |
| DE | 3245601 A1 | 6/1984 |
| DE | 3315779 A1 | 11/1984 |
| DE | 9110687 U1 | 10/1991 |
| DE | 19613700 A1 | 10/1997 |
| DE | 29806487 U1 | 7/1998 |
| DE | 102011001712 A1 | 10/2012 |
| EP | 1842823 A1 | 10/2007 |
| EP | 2616379 B1 | 6/2014 |
| WO | 2006130189 A2 | 12/2006 |
| WO | 2010054852 A2 | 5/2010 |
| WO | 2010070915 A1 | 6/2010 |
| WO | 2012130630 A1 | 10/2012 |
| WO | WO-2012130630 A1 * | 10/2012 ................ B60L 5/08 |
| WO | 2012130630 A9 | 5/2013 |
| WO | 2015130879 A1 | 9/2015 |
| WO | 2015154896 A1 | 10/2015 |

OTHER PUBLICATIONS

Search Report dated Nov. 25, 2014 in DE Application No. 202014101842.5.
International Search Report (with English translation) and Written Opinion dated May 15, 2015 in International Application No. PCT/EP2015/052421.
Search Report dated Nov. 27, 2014 in DE Application No. 102014103741.3.
Czichos, "Die Grundlagen der Ingenieurwissenschaften", Hütte, 8 pages (1996).
Matek, et al., "Maschinenelemente", vol. 16, 4 pages (1987).
Int'l Search Report and Written Opinion dated Oct. 15, 2015 in Int'l Application No. PCT/EP2015/052422.
International Preliminary Report on Patentability dated Sep. 20, 2016 in International Application No. PCT/EP2015/052421.
Int'l Search Report and Written Opinion dated May 19, 2015 in Int'l Application No. PCT/EP2015/052422.
Int'l Preliminary Report on Patentability (English translation) and Written Opinion dated Sep. 20, 2016 in International Application No. PCT/EP2015/052421.
Int'l Preliminary Report on Patentability (English translation) dated Oct. 12, 2016 in Int'l Application No. PCT/EP2015/052422.
Written Opinion (English Translation) dated May 19, 2015 in Int'l Application No. PCT/EP2015/052422.

* cited by examiner

POSITIONING AREA FOR A ROUTE FOR VERTICALLY INSERTING CURRENT COLLECTOR CONTACTS IN THE CURRENT RAILS OF THE ROUTE

CROSS-REFERENCE TO RELATED APPLICATIONS

This application is a Section 371 U.S. National Stage Filing of International Application No. PCT/EP2015/052422, filed Feb. 5, 2015, which was published in the German language on Oct. 15, 2015, under International Publication No. WO 2015/154896 A1, which claims priority to German Patent Application No. 10 2014 105 228.5, filed on Apr. 11, 2014, the disclosures of which are incorporated herein by reference.

The present invention relates to a positioning zone for a travel path, the travel path having at least one guide rail and the guide rail being used to guide a current collector trolley, provided with current collector contacts, of a current collector system arranged on a vehicle which can be moved along the travel path, and the travel path has at least one travel path conductor bar and the current collector trolley can be moved horizontally and vertically to the travel path in the positioning zone by a positioning device of the current collector system.

WO 2010/054852 A2 discloses a current collector system and a travel path for container stacking cranes. Arranged on the container stacking crane is a respective current collector system which has a telescopic arm, on the free end of which a current collector trolley is mounted in a vertically displaceable manner. The telescopic arm is advanced horizontally relative to the conductor bar arrangement by an electrical, hydraulic or pneumatic drive until stops of the current collector trolley strike against a baffle plate of the positioning zone of the travel path. The current collector trolley is delivered vertically to the conductor bars mechanically via an entry ramp, a respective entry ramp being arranged at each end of the conductor bar arrangement. Here, disadvantages are that a particular amount of space is required for the vertical delivery and introduction of the current collector trolley with its current collector contacts into the travel path and that the crane has not yet been supplied with electrical energy in the region of the entry ramp. The fact that the crane cannot lower or raise any containers without a supply of electrical energy via the conductor bars means that containers cannot be set down in the region of the entry ramp or the baffle plate has to be configured with a projection with respect to the container.

Also in the power supply system known from WO 2012/130630 A9, the current collector trolley is firstly positioned horizontally and vertically to the travel path guide and to the travel path conductor bars, after which the crane is then moved in the direction of the travel path and the current collector trolley is thereby introduced horizontally with its rollers into the travel path guides and the current collector contacts are inserted horizontally into the travel path conductor bars. If the current collector trolley of the system known from WO 2012/130630 A9 is still in the positioning zone, the current collector contacts have not yet been inserted into the travel path conductor bars, as a result of which, in this system as well containers cannot be set down in the positioning zone.

The object of the present invention is to develop the positioning zone of a travel path such that the vehicle, particularly in the form of a crane can also be adequately supplied with electrical energy in the positioning zone.

This object is advantageously achieved with a positioning zone in which at least one further conductor bar is arranged in the region of the positioning zone or at least one travel path conductor bar extends and/or is extended into the positioning zone beyond at least one guide rail of the travel path. In this respect, the further conductor bar or travel path conductor bar can extend over at least 50%, preferably over at least 75%, more preferably over at least 75-100% of the longitudinal extent of the positioning zone. The current collector contacts of the current collector trolley can thereby advantageously be inserted into the further conductor bar(s) or into the travel path conductor bar(s) extending into the positioning zone just by the horizontal and finally vertical delivery of the current collector trolley, so that the vehicle, particularly the crane or container stacking crane can even be supplied with electrical energy in the positioning zone and the lifting function of the crane can thereby even be utilised in the positioning zone.

Furthermore, it is possible to optimise the projections of the steel construction to increase the operational safety because containers can be set down in the region of the steel construction for the travel path and the positioning zone. The containers which have been set down thus protect the steel construction of the travel path. The travel path can be advantageously shortened due to the positioning zone according to the invention, as a result of which it is possible to save material and the travel path overall can be produced more economically. Furthermore, the installation clearance on the vehicle or crane (RTG) for the telescopic arm of the current collector system is advantageously increased with the positioning zone according to the invention, since the telescopic arm can also be attached to the crane eccentrically, i.e. off-centre thereto, and not in the centre of the crane, as is known from the prior art.

Since the current collector contacts of the current collector trolley are inserted vertically into the electrified or electrifiable conductor bars when the vehicle is stationary, the positioning zone can advantageously be of a relatively short configuration. Depending on how precisely the vehicle can be arranged with its current collector trolley in front of the positioning zone, the length of the longitudinal extent in the travel path direction of the positioning zone or of the baffle plate is only to be formed at best minimally longer than the width of the current collector trolley. However, a prerequisite for this is that the current collector trolley of the vehicle can be moved or delivered both horizontally and vertically by a positioning device which is arranged on the vehicle side, as is the case for example in the power supply system known from WO 2012/130630 A9. Thus, the telescopic arm can be retracted and extended, for example by a belt drive or a chain drive, or by electric, pneumatic or hydraulic means. The current collector trolley can also be delivered vertically by a chain drive, a belt drive or by a spindle drive. The drive is more preferably provided by a single rigid chain, in which case only a single drive and only one rigid chain arrangement is required for the horizontal extension and retraction of the telescopic arm and for the vertical raising and lowering of the current collector trolley.

It is possible to advantageously arrange in the positioning zone a baffle plate or another stop, against which the current collector trolley is horizontally movable or displaceable and can thereby be oriented in the horizontal direction relative to the further conductor bar and travel path conductor bar. After driving horizontally against the baffle plate, the current collector trolley can then be moved vertically, in particular raised, until the current collector contacts engage in the further conductor bar or in the travel path conductor bar, arranged in the positioning zone, and contact them.

To position and guide the current collector trolley in a vertical direction relative to the further conductor bar and to the travel path guides and to the at least one travel path conductor bar, at least one further guide rail can advantageously be arranged above and/or below the further conductor bar or the end of the conductor bar. This guide rail also serves as a vertical stop and can advantageously extend by its end facing the end of the travel path as far as possible into the region of the travel path that the guide rails of the travel path terminate with their ends under the further guide rail.

If the further conductor bar is a conductor bar which is separate from the travel path conductor bar, it is advantageously connected to the conductor bar of the travel path by a conductor bar connector.

So that the current collector contacts can be easily inserted vertically, i.e. from below into the conductor bars in the positioning zone, the further conductor bar or at least the end region of the travel path conductor bar extending in the positioning zone can be configured for the vertical insertion of the current collector contacts of the current collector trolley, in particular it can have small vertical introduction funnels or introduction means.

The positioning zone is advantageously configured for a power supply travel path of a crane, in particular for a container stacking crane (RTG—rubber tired gantries). Furthermore, a travel path with a previously described positioning zone is claimed very generally, it being possible for the travel path conductor bar to have a plurality of conductor bars which are arranged parallel to one another, are insulated from one another and are arranged in a housing or on a support on the travel path.

To insert the current collector contacts of the current collector system into the conductor bar of the travel path, the vehicle or the container stacking crane is firstly positioned in front of the positioning zone so that the current collector trolley can then be moved horizontally and vertically by the positioning device, arranged on the vehicle, of the current collector system which has a single drive or separate drives for the horizontal and vertical delivery of the current collector trolley, so that the current collector contacts can be inserted into the further conductor bar(s) or into the end region(s), projecting into the positioning zone, of the travel path conductor bars with a final vertical movement of the current collector trolley, in particular a vertical lifting movement in the positioning zone and electrical contact can be established between the conductor bars and the current collector contacts. Due to a force control when rotary field magnetic motors or static torque motors are used, the control means for the positioning device of the vehicle combined with a position detection unit (sensors) can detect when the current collector trolley has run against the baffle plate or against the horizontal stop and/or when the current collector trolley has run against the upper guide rail of the positioning zone.

Figure 1A:
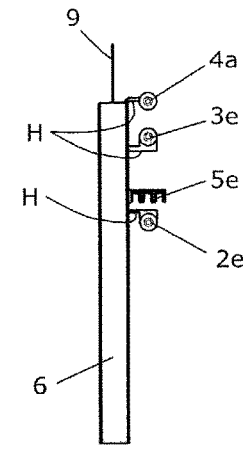
Figure 2:
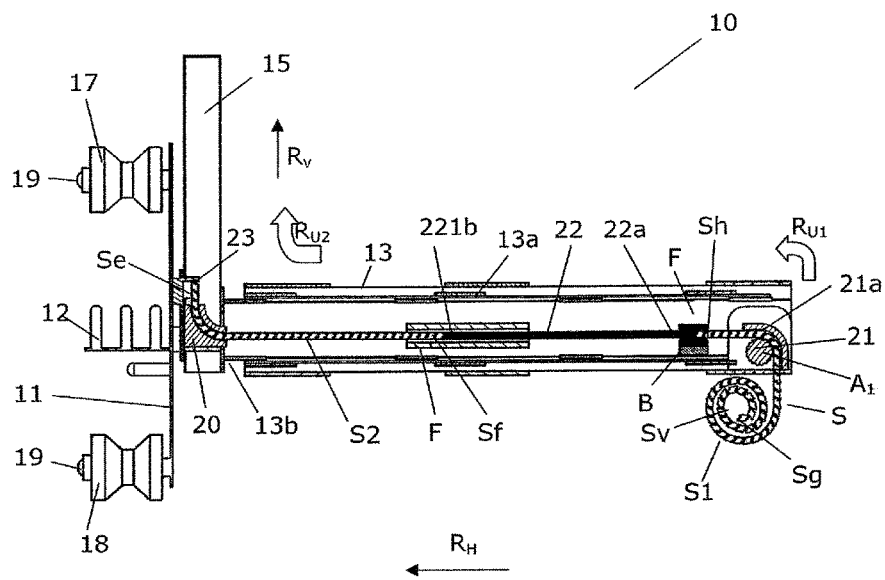
Figure 3:
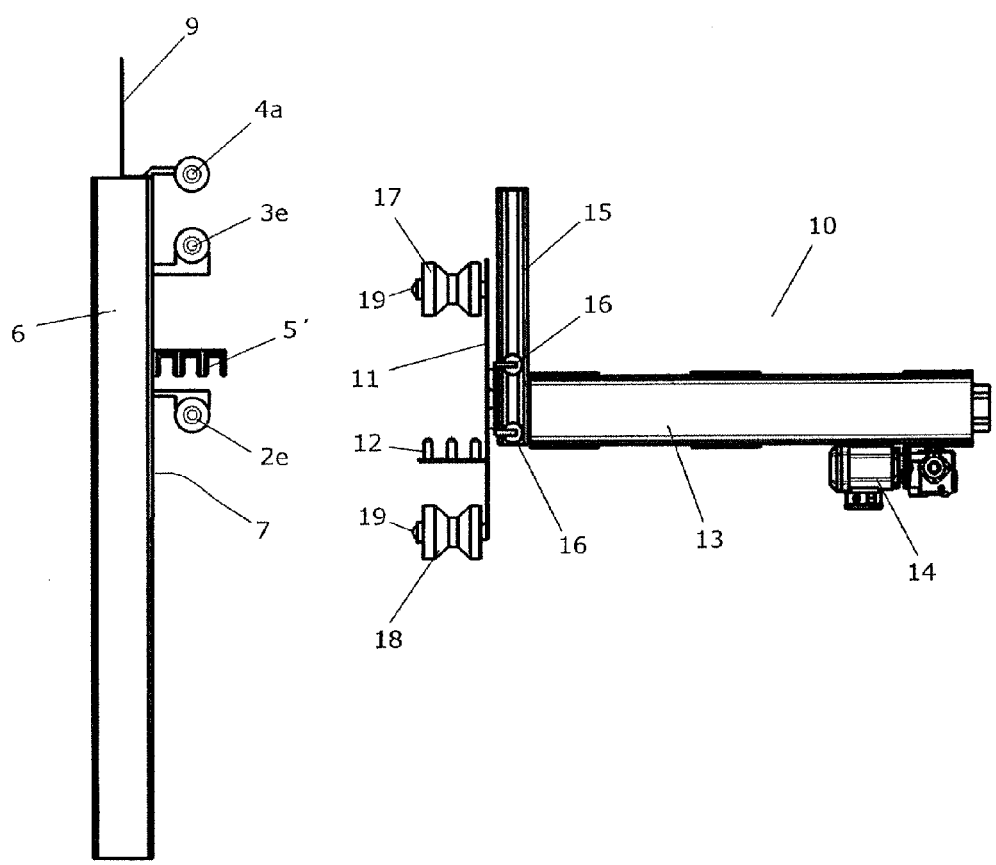
Figure 4A:
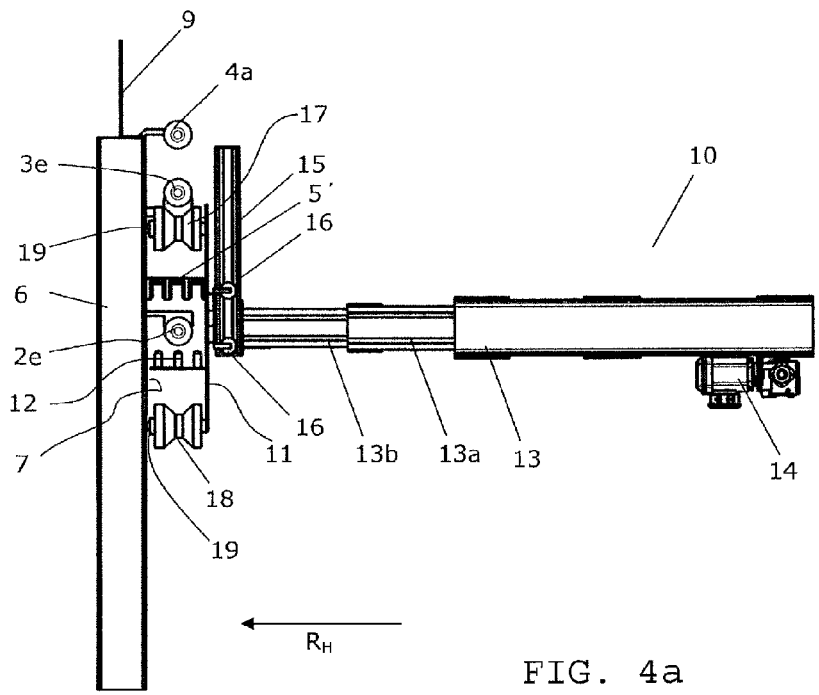
Figure 4B:
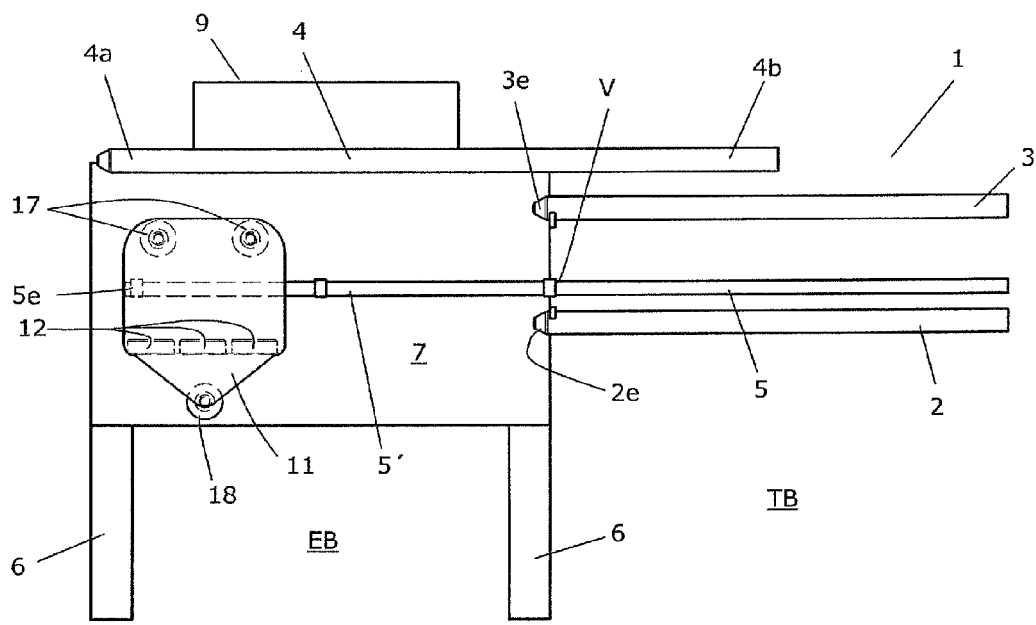
Figure 5A:
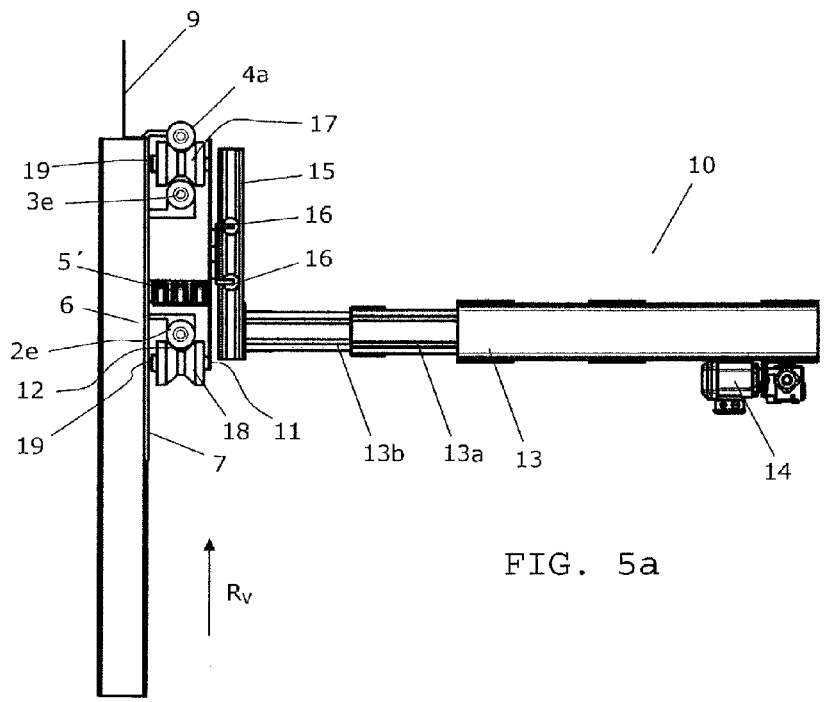
Figure 5B:
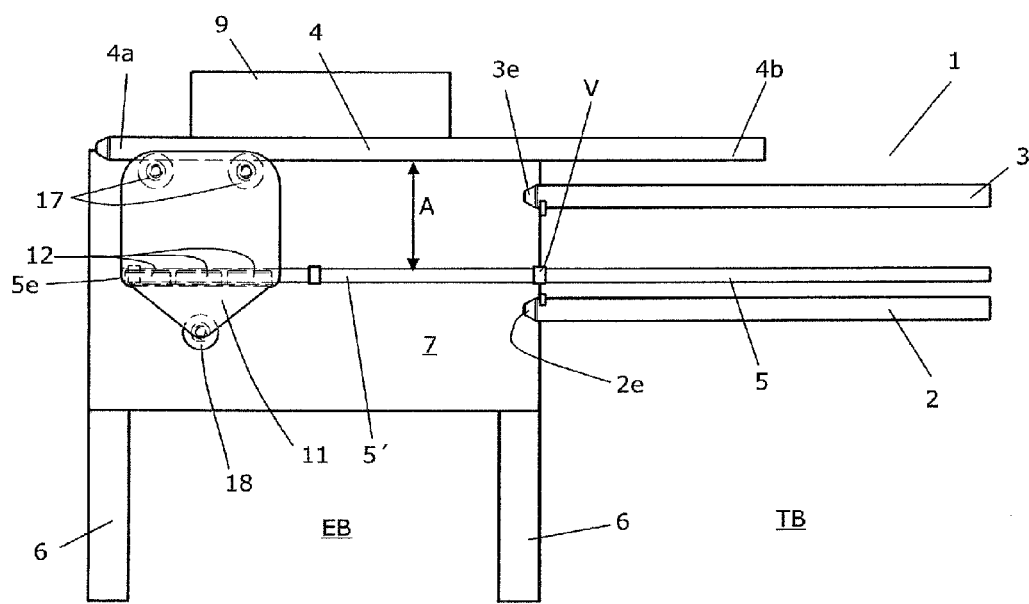
Figure 6A:
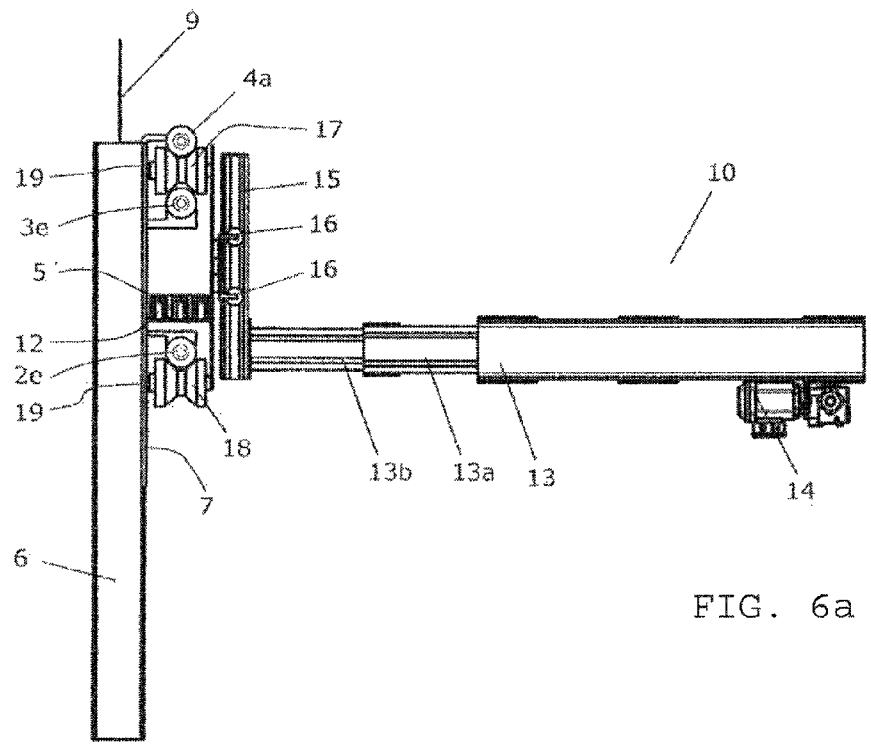
Figure 6B:
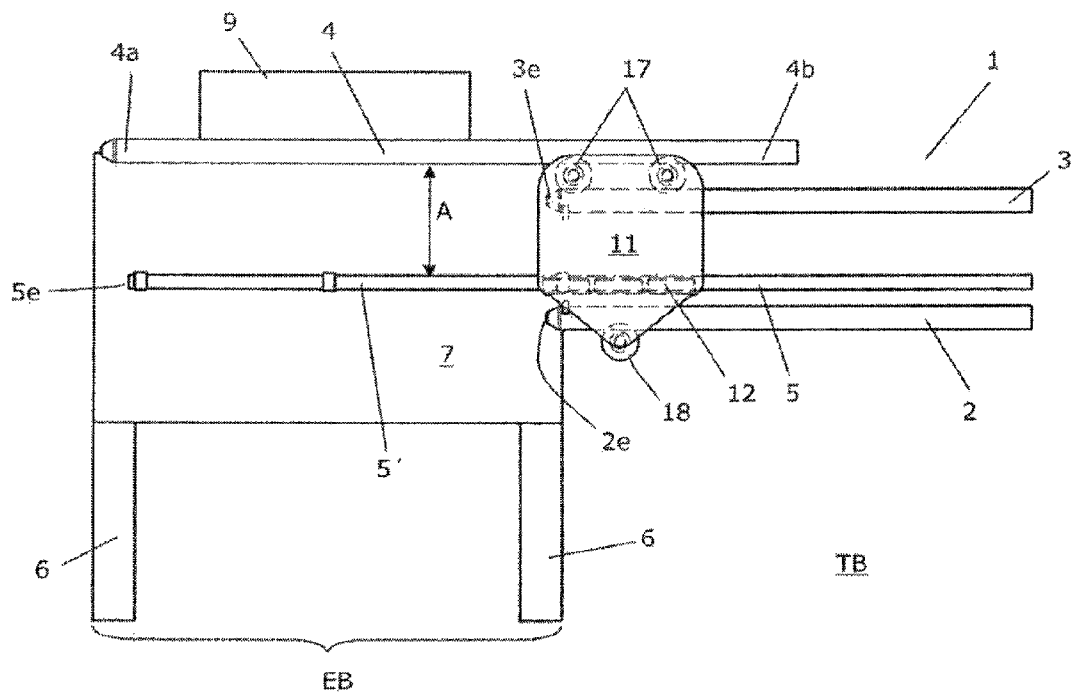
Figure 7A:
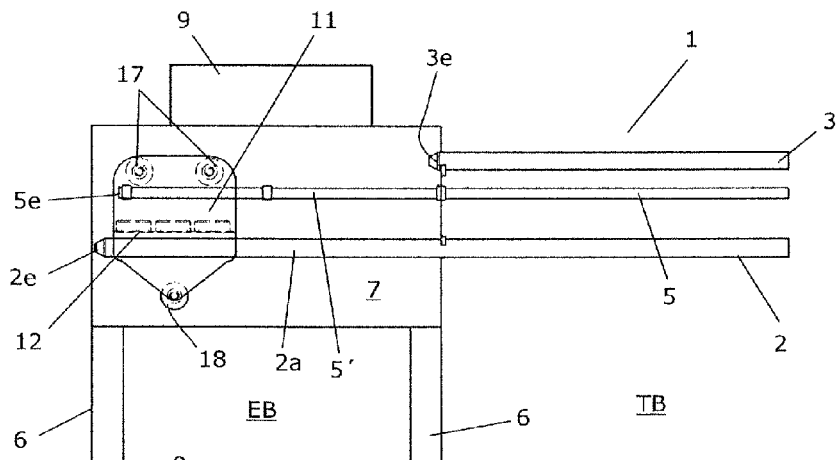
Figure 7B:
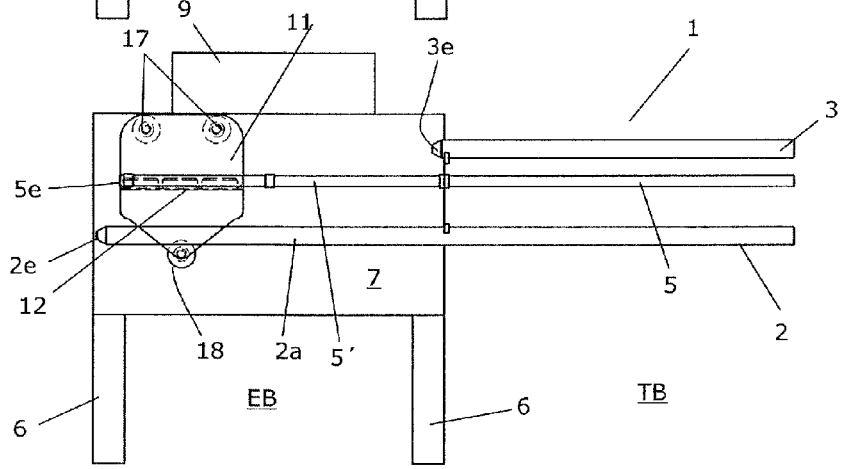
Figure 7C:
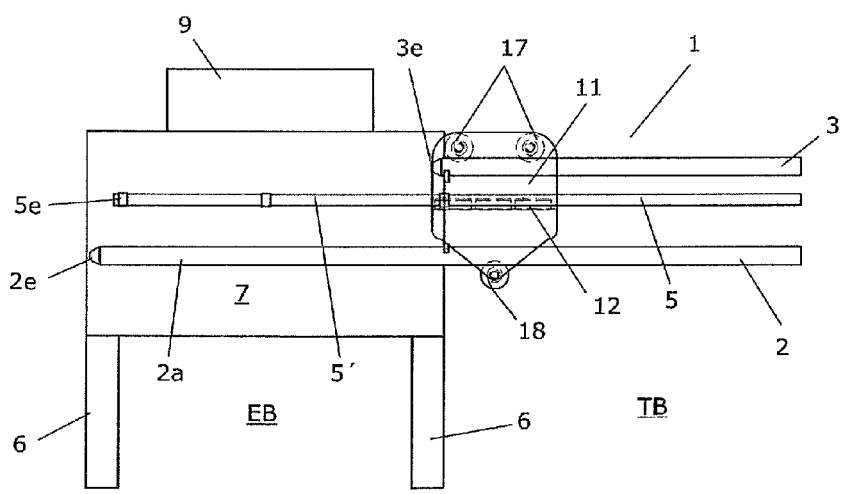
Figure 8A:
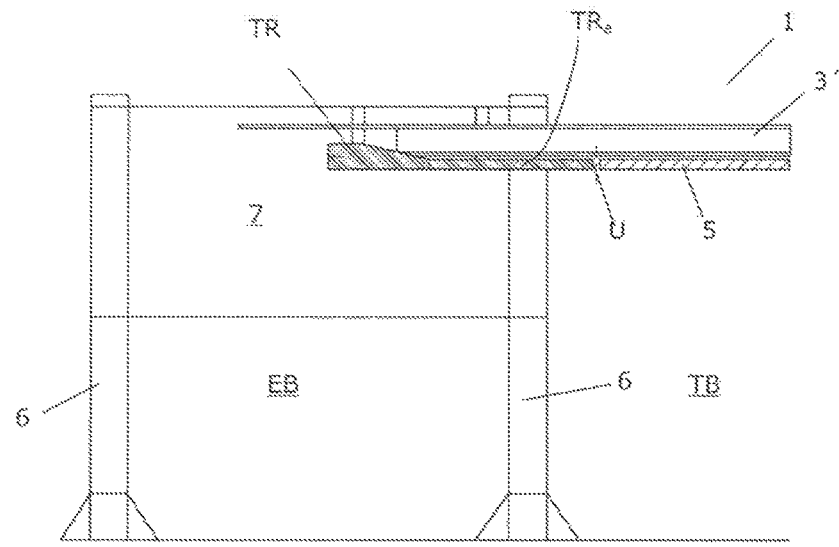
Figure 8B:
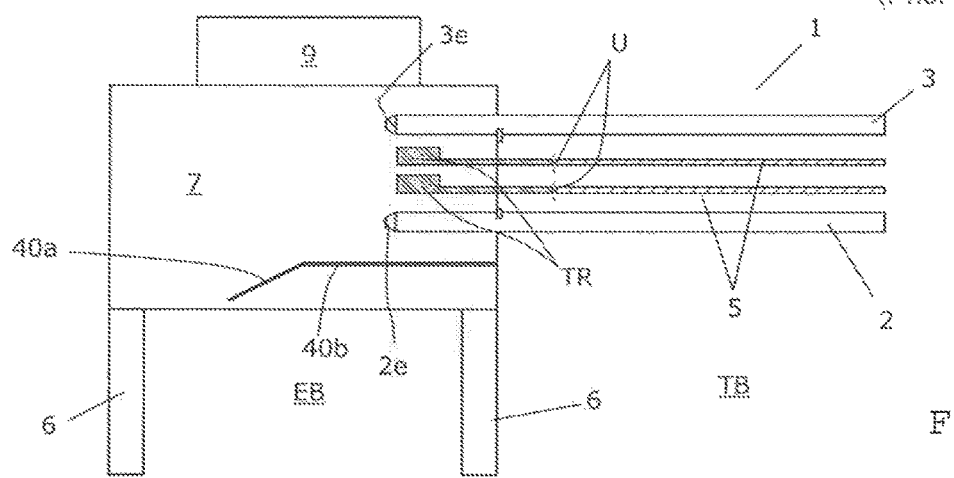

In the following, the invention will be described in more detail with reference to drawings, in which:

FIGS. 1 and 1a: are a front view and a side view of the positioning zone according to the invention with an adjoining travel path;

FIG. 2: shows a possible embodiment of a current collector system in which the current collector trolley can be delivered both horizontally and vertically by a rigid chain and a single drive;

FIG. 3: is a side view of the positioning zone and of the current collector system positioned in front of the positioning zone with a telescopic arm and a current collector trolley arranged thereon, the telescopic arm not yet having been extended horizontally;

FIGS. 4a and 4b: are a front view and a side view of the positioning zone and of the current collector system positioned in front of the positioning zone with a telescopic arm and a current collector trolley arranged thereon, the telescopic arm having been extended horizontally and the current collector trolley striking the baffle plate of the positioning zone, although it has not yet been raised vertically;

FIGS. 5a and 5b: are a front view and a side view of the positioning zone and of the current collector system, the current collector trolley having been raised vertically and the current collector contacts are engaging in the conductor bar and have electrical contact therewith;

FIGS. 6a and 6b: are a front view of the positioning zone and of the adjoining travel path with the current collector trolley having moved into the travel path and also a cross-sectional view through the travel path in the region of the current collector trolley;

FIG. 7a-c: show an alternative embodiment of the positioning zone according to the invention, in which the lower guide rail of the travel path extends over the entire longitudinal extent of the positioning zone;

FIGS. 8a and 8b: show positioning zones according to the prior art'

Figure 8C:
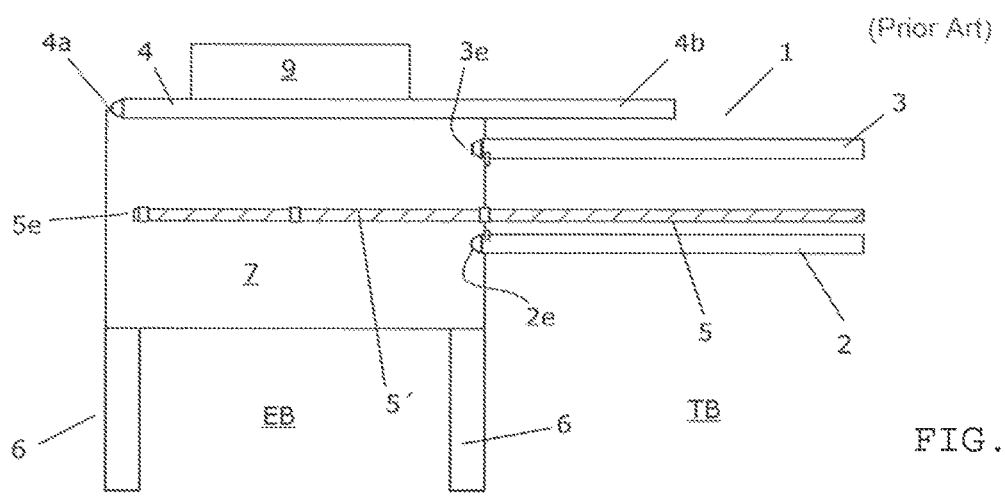
Figure 9A:
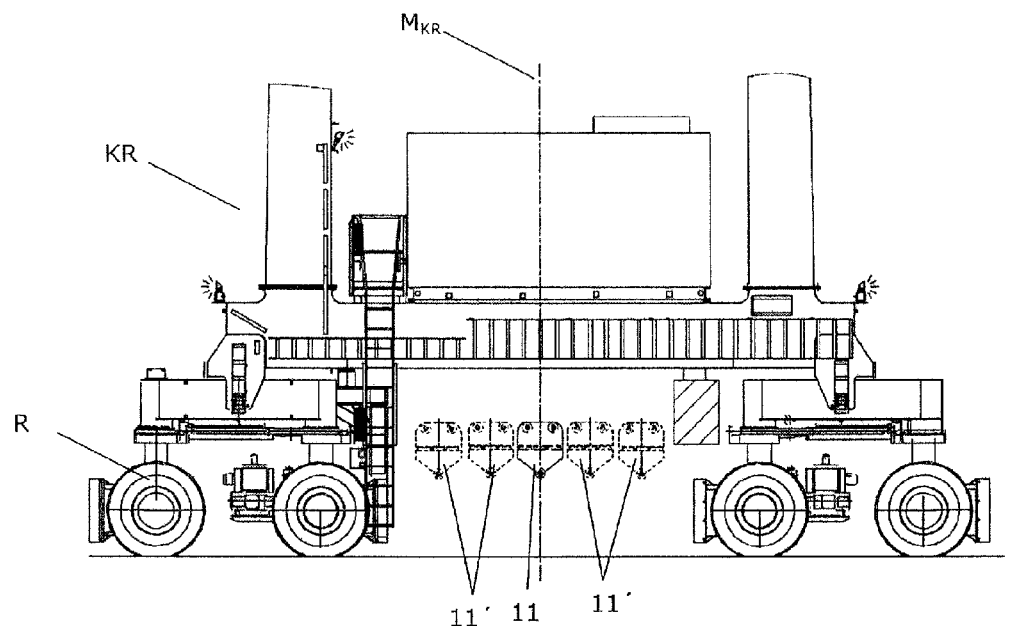
Figure 9B:
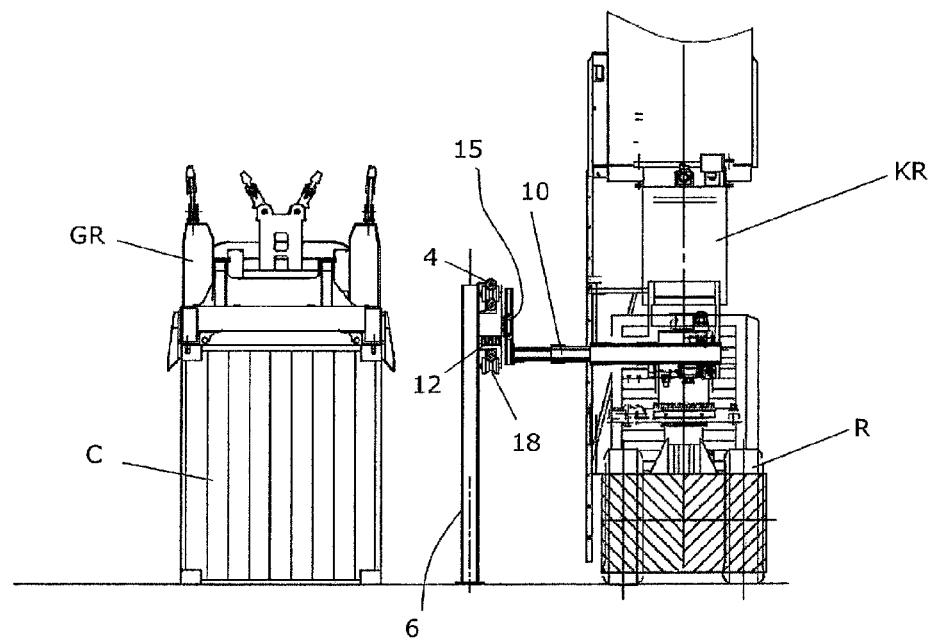
Figure 10:
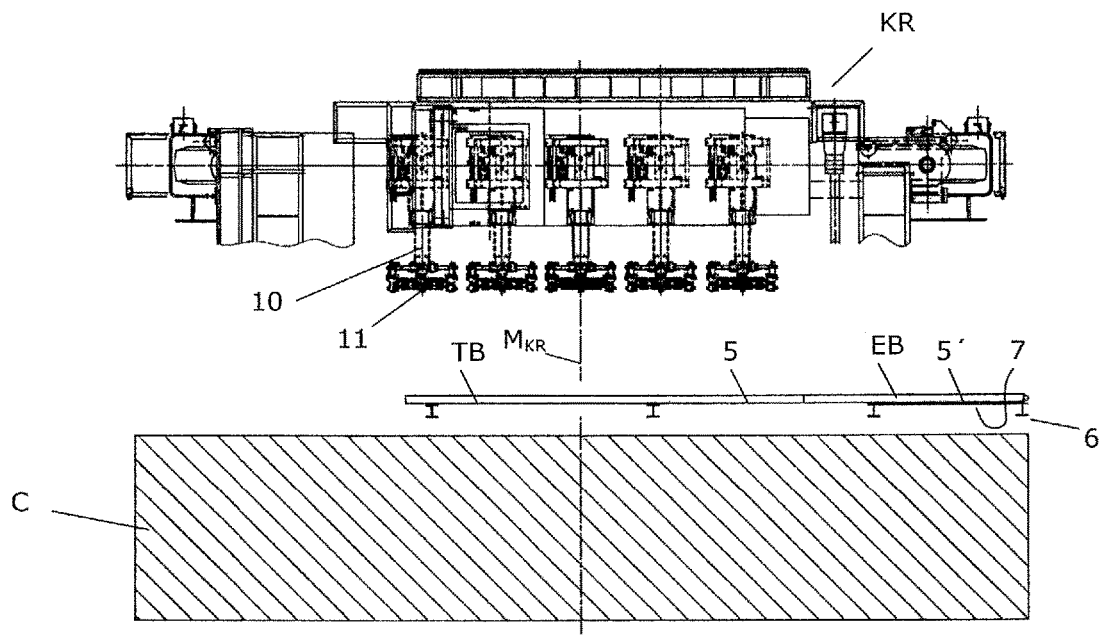
Figure 11:
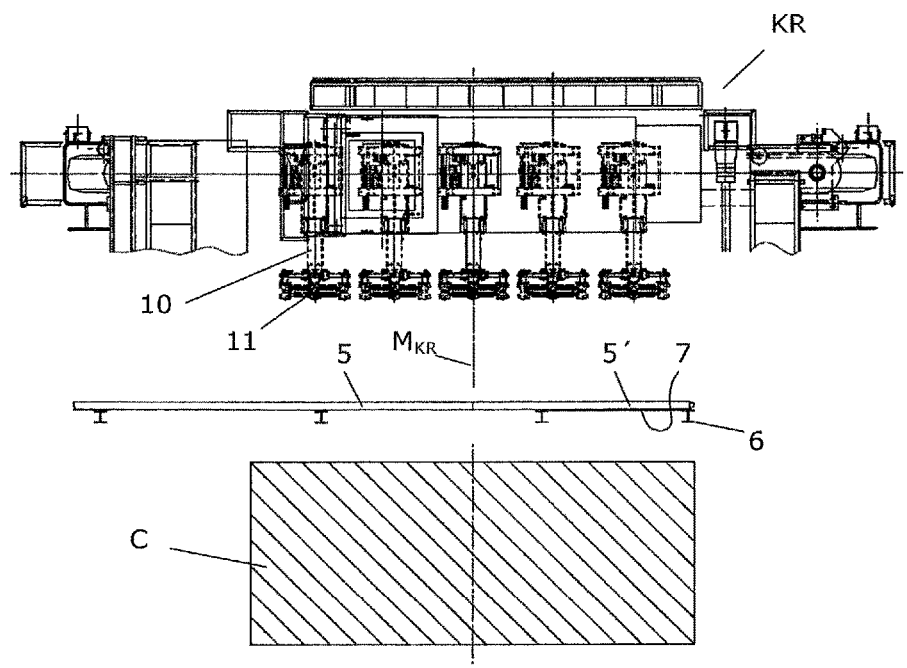
Figure 12:
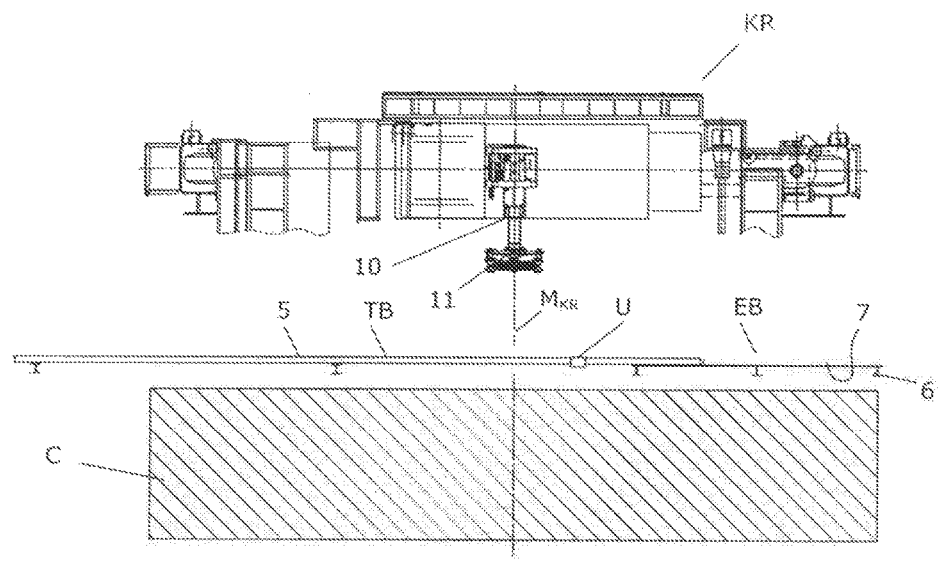
Figure 13:
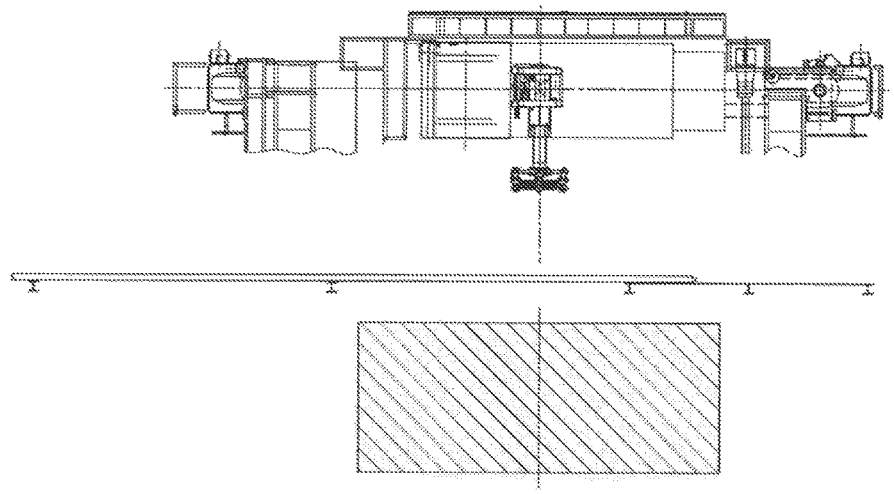

FIG. 8c: shows the positioning zone according to the invention with a conductor bar electrified in the positioning zone;

FIG. 9a: is a side view of a container stacking crane in the region of the wheels and of the current collector system with the current collector trolley arranged inbetween;

FIG. 9b: is a front view of a travel path with a set-down container and a container stacking crane;

FIGS. 10 and 11: are plan views of a travel path entry and of a container stacking crane with a telescopic arm arranged at different points, it being possible in FIG. 10 for a 40 foot container to be stacked and for a 20 foot container to be stacked in FIG. 11;

FIGS. 12 and 13: are plan views of a travel path entry according to the prior art, with a container stacking crane having a centrally arranged telescopic arm, it being possible in FIG. 12 for a 40 foot container to be stacked and for a 20 foot container to be stacked in FIG. 13.

FIG. 1 is a front view of the positioning zone EP according to the invention with the adjoining travel path region TB of the travel path 1. The positioning zone EP has two supports 6 on which a baffle plate 7 as well as an upper guide 4 and the further busbar 5' are arranged. The further busbar 5' can also be formed by the end region 5e of the travel path busbar 5 which extends into the positioning zone EP. The positioning zone EP has a longitudinal extent $EB_L$. The travel path guides 2, 3 which are formed by pipes and are attached to the travel path 1 or to the supports thereof (not shown) by spacers H extend slightly by their ends 2e, 3e into the positioning zone EP. However, they can also terminate outside the positioning zone EP. It is merely necessary to ensure that the travel path guides 2, 3 and the end 4b, projecting into the travel path 1, of the upper guide 4 overlap one another so that the current collector trolley is introduced safely by its rollers 17, 18 into the travel path guides 2, 3 from the positioning zone EP.

If the busbar 5', arranged in the positioning zone EP, is not formed integrally with the travel path busbar 5, it is to be connected to the travel path busbar 5 by a busbar connector V. It is not essential to the invention whether this is implemented exactly in the position shown in FIG. 1 or further to the left or right. The busbar 5' or the end 5e of the travel path busbar is attached to the positioning zone EP by mounts 8. Arranged above the baffle plate 7 is a further plate 9 which is used to detect the baffle plate.

FIG. 1a is a side view of the positioning zone EB. The guides 2, 3 and 4 are attached to the positioning zone EB or to the travel path 1 by mounts H.

FIG. 2 is a longitudinal sectional view through a possible embodiment of a current collector system 10 with a telescopic arm 13 which can be extended and retracted by the rigid chain S. The telescopic arm 13 has the two extensible telescopic stages 13a and 13b, the vertical guide 15 for the current collector trolley 11 being arranged on telescopic stage 13b which can be extended furthest. The first telescopic stage 13 is rigidly connected to the vehicle or to the container stacking crane and can therefore not be telescoped.

The rigid chain arrangement S is composed of the two rigid chain segments S1 and S2 and of the interposed rigid force transmission element 22. One end Sh of the first rigid chain segment S1 is connected to the first end 22a of the rigid force transmission element 22. The second rigid chain segment S2 is connected by its first end Sf to the second end 22b of the rigid force transmission element 22 and it cooperates by its other end Se with a stop 23 which is rigidly connected to the current collector trolley 11. Of course, it is also possible for the end Se of the rigid chain to be rigidly connected to the part 23.

The rigid chain segment S1 is constructed such that it can only be deflected into the first direction $R_{U1}$ by the deflection chain sprocket 21 and the guide 21a. The rigid chain segment S1 is configured to be resistant to buckling opposite direction $R_{U1}$. The rigid chain arrangement S is driven by the deflection toothed wheel or deflection sprocket wheel 21 for retracting and extending the telescopic arm 13, and also at least for lifting the current collector trolley 11. If the drive 14 (see FIG. 3) is connected without current, the rigid chain arrangement S can be moved freely around the deflection chain sprocket 21 due to the forces acting from outside on the current collector system 10, so that the telescopic arm 13 can be freely retracted and extended without relatively great counterforces to compensate the changing distance between vehicle and travel path T. Likewise, the current collector trolley 11 can move freely in a vertical direction along the guide 2, 3 as soon as the rigid chain drive 14 is connected without current. If the two rigid chain segments S1 and S2 are composed of the same rigid chain elements, the two rigid chain segments S1 and S2 are arranged on the force transmission element 22, rotated by an angle of 180 relative to one another so that the direction deflections $R_{U1}$ and $R_{U2}$ are possible in opposite directions by the deflection devices 20 and 21, 21a. Of course, it is also possible for the deflection to be carried out by the deflection sprocket wheel 21, for example in a direction which is oriented vertically to the plane of the drawing.

As shown in FIG. 2, the rigid chain elements of the rigid chain segment S2 are deflected into direction $R_{U2}$ by the deflection device 20. The rigid chain elements are constructed such that the rigid chain segment S2 can be deflected into direction $R_{U2}$ merely by the deflection device 20 which has curved guide surfaces for the rigid chain elements. The rigid chain segment S2 is resistant to buckling opposite direction $R_{U2}$. FIG. 2 shows the telescopic arm 2 in the retracted state. The free end region Sv or the free end Sg of the first rigid chain segment S1 which is not yet required for force transmission or is not yet in the region between the deflection toothed wheel 21 and the deflection device 20 is wound up in a space-saving manner. However, it is also possible for the free end Sg to be stored in a meander shape or parallel to the telescopic arm 13.

The rigid chain arrangement is guided by a guide F which is arranged on the second telescopic stage 13b. The guide F can be formed, for example from a U profile. The space formed by the U profile can optionally be covered with a cover plate. The cover plate prevents the rigid chain S1 from buckling upwards which is undesirable.

FIG. 3 is a side view of the positioning zone EB and of the current collector system 10 which is positioned in front of the positioning zone and has a telescopic arm 13 and a current collector trolley 11 which is arranged on the telescopic arm vertically along the vertical guide 15. The telescopic arm 13 has not yet been extended horizontally to the left and the current collector trolley 12 is in its lower position.

FIGS. 4a and 4b are a front view and a side view of the positioning zone EB and of the current collector system 10 positioned in front of the positioning zone, the telescopic arm 13, consisting of the telescopic stages 13a and 13b having been extended horizontally to the left and the current collector trolley 11 striking against the baffle plate 7 of the positioning zone EB with its rollers 17, 18 and with the impact rollers 19 thereof. The current collector trolley 12 is still in the lowest position in which the current collector contacts 12 are still below the further conductor bar 5'. The rollers 17, 18 are also still under the guides 2, 3 and 4.

When the current collector trolley 11 is raised vertically, it arrives in the position shown in FIGS. 5a and 5b in which it strikes from below against the upper guide 4 with its upper rollers and the current collector contacts 12 engage in the conductor bar 5' and have electrical contact therewith. It can be seen that the rollers 17, 18 which are configured as diabolo rollers are positioned with respect to the travel path guides 2, 3 such that when the current collector trolley 12 is moved in the direction of the travel path 1, it is guided by the upper guide 4 and moves with its rollers 17, 18 onto the travel path guides 2, 3 and is then guided by said guides horizontally and vertically, as shown in FIGS. 6a and 6b.

FIGS. 7a to 7c show the positioning and introduction of the current collector system into an alternative embodiment of the positioning zone EP according to the invention, in which the lower guide rail 2 of the travel path 1 extends by its end 2a over the entire longitudinal extent $EB_L$ of the positioning zone EB. Consequently, it is possible to dispense with the additional guide rail 4 according to the embodiment shown in FIGS. 1 to 6b. Of course, the guide rail 4 can optionally still be provided. FIG. 7a shows the position after the telescopic arm 10 has been extended horizontally to such an extent that the current collector trolley 11 strikes the baffle plate 7. In this respect, it should be noted that the telescopic arm 10 is attached to the vehicle KR in such a manner to ensure that when the telescopic arm 10 is extended horizontally, the current collector contacts 11 are located above the lower guide rail 2, 2a. FIG. 7b shows the position after the current collector trolley 11 has been moved vertically upwards, the current collector contacts 11 engage in the conductor bar 5' and contact them and the lower roller 18 presses from below against the lower guide rail 2a. The vehicle can then be moved in the direction of the travel path, as a result of which the upper rollers 17 also engage from above around the upper guide rail 3 and the current collector trolley 11 is held securely by the guide rails 2, 3 and is guided thereby.

FIGS. 8a and 8b show positioning zones EB as they are known from the prior art. The positioning zone EB which is shown in FIG. 8a and is used for a power supply system known from WO 2012/130630 A9 has a baffle plate 7 which is attached to supports 6. In this system, the current collector trolley (not shown) is firstly moved horizontally against the baffle plate 7 to then be moved vertically upwards by a vertical drive arranged on the telescopic arm, until the current collector trolley has been positioned vertically by a mechanical stop. The vehicle is then moved in the direction of the travel path, as a result of which the current collectors pass into the introduction funnel TR which is not electrified, and the rollers arranged on the current collector trolley move into the horizontal travel path supports 3' and as a result the current collector trolley is guided and held by the travel path 1. The introduction funnel TR extends with its horizontal guide region $TR_a$ into the travel path region TB, a gap U being provided so that the guide region $TR_a$ does not come into contact with the electrified conductor bar 5.

In the system shown in FIG. 8b, provided in the positioning zone EB are guide rails 40a, 40b which raise the current collector trolley 11, which has been moved horizontally against the baffle plate 7 by the telescopic arm, when the vehicle moves in the direction of the travel path, so that it is positioned horizontally and vertically to the guide rails 2, 3 and to the introduction funnel TR of the travel path 1. In this system as well which is used for a current collector system known from WO 2010/054852 A2, the introduction funnels TR are not electrified and are uncoupled from the electrified conductor bar 5 of the travel path 1 by a gap or an electrical insulator U.

FIG. 8c shows the positioning zone EB according to the invention with the electrified conductor bar 5, 5' which extends into the positioning zone EB. Due to the continuous electrification of the conductor bar 5, 5', the vehicle is immediately electrified after the vertical insertion of the current collector contacts.

FIG. 9a is a side view of a container stacking crane KR in the region of the wheels R and of the interposed current collector system with current collector trolleys 11, 11', which system can be arranged on the centre axis $M_{KR}$ of the crane KR or also on the side thereof (11'). This is possible because the container stacking crane is already electrified in the positioning zone EB according to the invention.

FIG. 9b is a front view of a travel path with a container C which has been set down and a container stacking crane KR, the telescopic arm 10 having been extended horizontally so that the current collector trolley 11 strikes against the baffle plate 7.

FIGS. 10 and 11 are plan views of a travel path entry and of a container stacking crane KR with telescopic arms 10 arranged at different points. Since the conductor bar 5' extends into the positioning zone EB, the container C can be set down and raised in the positioning zone EB even if the telescopic arm 10 is arranged eccentrically on the crane, as indicated by the telescopic arms 10' shown in dashed lines. Even with an eccentric arrangement of the telescopic arms 10', both 20 foot and 40 foot containers C can be set down so that they terminate flush with the positioning zone EB.

FIGS. 12 and 13 are plan views of a travel path entry with non-electrified positioning zones according to the prior art. Here, it is not possible to set down 20 foot and 40 foot containers C flush with the beginning of the positioning zone EB or to raise them therefrom using an eccentrically arranged telescopic arm 10, as is possible with the electrified positioning zone EB according to the invention. It can be clearly seen in FIGS. 12 and 13 that the crane KR must keep moving into the travel path until the telescopic arm 11 with its current collector contacts 12 is in the travel path region TB. If the telescopic arm 10 were to be attached to the crane KR being offset further to the right relative to the centre axis $M_{KR}$, the crane KR would have to travel further to the left into the travel path by the offset in order for the current collector trolley 11 to move into the conductor bars 5 with its current collector contacts via the gap U. Only then is the crane KR electrified and is able to raise and set down the container C. However, then it would also no longer be possible for the 40 foot container C to be set down flush with the positioning zone EB.

What is claimed is:

1. A positioning zone structure defining a positioning zone located along a travel path for a vehicle, wherein a travel path structure is disposed along the travel path, wherein the travel path structure has at least one guide rail, and wherein the guide rail is used to guide a current collector trolley, provided with current collector contacts, of a current collector system arranged on the vehicle, wherein the vehicle is able to move along the travel path, and wherein the travel path structure has at least one travel path conductor bar, wherein, in the positioning zone, the current collector trolley is enabled to be moved horizontally and vertically with respect to the travel path by a positioning device of the current collector system, the positioning zone structure including a component selected from the group consisting of:
   at least one further conductor bar arranged in a region of the positioning zone; and
   an extension of the at least one travel path conductor bar into the positioning zone;
   wherein the at least one further conductor bar or at least a region of the at least one travel path conductor bar extending in the positioning zone is configured for vertically inserting the current collector contacts of the current collector trolley.

2. The positioning zone structure according to claim 1, wherein the at least one further conductor bar or the extension or extensions of the at least one travel path conductor bar extends over at least 50% of a longitudinal extent of the positioning zone.

3. The positioning zone structure-according to claim 1, further including a baffle plate arranged in the positioning zone, against which baffle plate the current collector trolley is enabled to be moved horizontally.

4. The positioning zone structure according to claim 1, further including at least one further guide rail for vertical alignment and/or as a vertical stop for the current collector trolley arranged above and/or below the further conductor bar or the extension of the conductor bar.

5. The positioning zone structure-according to claim 4, wherein the further guide rail extends into a region of the travel path.

6. The positioning zone structure according to claim 4, wherein the guide rails of the travel path terminate with their ends under the further guide rail.

7. The positioning zone structure-according to claim 1, further including a conductor bar connector configured to connect the at least one further conductor bar to the at least one conductor bar of the travel path structure.

8. The positioning zone structure according to claim 1, wherein the travel path is a current supply travel path of a container stacking crane.

9. The positioning zone structure according to claim 1, wherein the vehicle is enabled to be supplied with electrical energy in the positioning zone by the at least one further conductor bar or by the extension of the at least one travel path conductor bar into the positioning zone.

10. The positioning zone structure according to claim 1, wherein the at least one guide rail comprises a lower guide rail, wherein the lower guide rail extends and/or is extended over 50-100% of a longitudinal extent of the positioning zone.

11. A travel path structure, including the positioning zone structure according to claim 1.

12. The travel path structure according to claim 11, wherein the at least one travel path conductor bar includes a plurality of conductor bars that are arranged parallel to one another, are isolated from one another and are arranged in a housing or on a support.

13. A crane system including the travel path structure according to claim 11, wherein the current collector system comprises a drive arranged to drive a rigid chain arrangement, by which a telescopic arm is enabled to be retracted and extended horizontally, and wherein the current collector trolley is enabled to be raised in a direction of the at least one further conductor bar or the extension of the at least one travel path conductor bar arranged in the positioning zone.

14. The positioning zone structure according to claim 1, wherein the at least one further conductor bar or the extension or extensions of the at least one travel path conductor bar extends over at least 75% of a longitudinal extent of the positioning zone.

15. The positioning zone structure according to claim 1, further comprising:
at least two vertical supports configured to support the positioning zone structure and arranged in a direction along the travel path, the at least two vertical supports including a first end support and a second end support, arranged at opposite ends of the positioning zone structure along the travel path, wherein a horizontal spacing between the first and second end supports, in a direction along the travel path, defines a longitudinal extent of the positioning zone.

16. The positioning zone structure according to claim 1, wherein the at least one guide rail comprises a single guide rail, distinct from the at least one further conductor bar or at least a region of the at least one travel path conductor bar extending in the positioning zone, wherein the single guide rail extends and/or is extended over 50-100% of a longitudinal extent of the positioning zone.

17. The positioning zone structure according to claim 16, wherein the single guide rail is disposed vertically above the at least one further conductor bar or at least a region of the at least one travel path conductor bar extending in the positioning zone.

18. The positioning zone structure according to claim 16, wherein the single guide rail is disposed vertically below the at least one further conductor bar or at least a region of the at least one travel path conductor bar extending in the positioning zone.

19. The positioning zone structure according to claim 16, wherein the positioning device of the current collector system is configured to use the single guide rail as a guide for vertical positioning.

20. A method of contacting current collector contacts of a current collector system of a vehicle in a vicinity of a positioning zone structure defining a positioning zone located along a travel path for a vehicle, wherein a travel path structure is disposed along the travel path, wherein the travel path structure has at least one guide rail, and wherein the guide rail is used to guide a current collector trolley, provided with current collector contacts, of a current collector system arranged on the vehicle, wherein the vehicle is able to move along the travel path, and wherein the travel path structure has at least one travel path conductor bar, wherein the current collector trolley is enabled to be moved horizontally and vertically with respect to the travel path in the positioning zone by a positioning device of the current collector system, the positioning zone structure including a component selected from the group consisting of at least one further conductor bar arranged in a region of the positioning zone; and an extension of the at least one travel path conductor bar into the positioning zone; wherein the at least one further conductor bar or at least a region of the at least one travel path conductor bar extending in the positioning zone is configured for vertically inserting the current collector contacts of the current collector trolley, the method including:
positioning the vehicle in front of the positioning zone structure;
using the positioning device of the current collector system to move the current collector trolley horizontally and vertically, so that in the positioning zone, the current collector contacts are inserted vertically into the at least one further conductor bar or into the extension or extensions of the at least one travel path conductor bar projecting into the positioning zone and an electrical contact is established between the at least one further conductor bar or the extension or extensions of the at least one travel path conductor bar and the current collector contacts.

* * * * *